United States Patent [19]

Sioshansi et al.

[11] Patent Number: 4,743,493
[45] Date of Patent: May 10, 1988

[54] ION IMPLANTATION OF PLASTICS

[75] Inventors: Piran Sioshansi, Bedford; Richard W. Oliver, Acton, both of Mass.

[73] Assignee: Spire Corporation, Bedford, Mass.

[21] Appl. No.: 915,414

[22] Filed: Oct. 6, 1986

[51] Int. Cl.⁴ .......................... B32B 27/08; B44C 5/08
[52] U.S. Cl. .................................... 428/217; 428/412; 428/421; 428/522; 428/523; 427/38
[58] Field of Search ............... 428/412, 696, 421, 217, 428/522, 523; 427/38

[56] References Cited

U.S. PATENT DOCUMENTS 4,526,832  7/1985  Bernett et al. ............... 427/38 X
4,554,208  11/1985  MacIver et al. ............... 427/38 X

OTHER PUBLICATIONS

Gerhard K. Wolf, "Chemical Properties of Ion Implanted Materials," *Treatise on Materials Science & Technology* (1980), pp. 373-414.
M. S. Dresselhaus, et al, "Ion Implantation of Polymers," Mat. Res. Soc. Symp. Proc., vol. 27 (1984), pp. 413-422.
Pehr E. Pehrsson, et al., "Chemical & Physical Interactions on Covalent Polymers Implanted with Transition Metals," Mat. Res. Soc. Symp. Proc., vol. 27 (1984) pp. 429-434.
N. C. Koor et al., "Magnetic Properties of Ion Implanted Polymers & Graphite", Mat. Res. Soc. Symp. Proc., vol. 27 (1984) pp. 445-448.
Piran Sioshansi, "Ion Beam Modification of Materials for Industry," Thin Solid Films, 118 (1984) pp. 61-71.
M. L. J. Beck et al., "The Mechanism of Ion Implantation Passivation of PMMA for Lithography with Ing Etch Development" Microelectronic Engineering, (1985) 451-458.

*Primary Examiner*—P. C. Ives
*Attorney, Agent, or Firm*—Morse, Altman, Dacey and Benson

[57] ABSTRACT

An ion implantation process for plastics is disclosed which materially enhances their surface hardness and their resistance to chemical attack. The plastics include the polycarbonates, the acrylics and their combinations, and ultra high molecular weight polyethylenes. The plastics are ion implanted by energetic ions such as aluminum, magnesium, silicon, titanium, yttrium, fluorine and chlorine ions. Such ion implanted plastics, in their transparent form, find uses such as aircraft, spacecraft, auto transparencies, lenses for safety and eyeglasses and contact lenses, face and gas masks and the like. In their non-transparent form, the ion implanted plastics are useful as ball bearings, safety helmets, floor coverings, appliance and auto moldings and the like.

5 Claims, 2 Drawing Sheets

ION IMPLANTATION OF PLASTICS

BACKGROUND OF INVENTION

1. Field of the Invention

The present invention relates generally to ion implantation of plastics and, more particularly, to an ion implantation process for plastics which materially enhances their surface hardness and their resistance to chemical attack.

2. The Prior Art

Ion implantation is a method that was originally developed in the semiconductor industry to effect precise doping of silicon wafers with impurities. From there, the method spread to the ion implantation of metals and compounds, see *Treatise on Materials Science and Technology*, Vol. 18, "Ion Implantation," 1980, Academic Press, Inc. See also a copending application, assigned to the common assignee herein, entitled "Ion Implantation of Titanium Workpieces Without Surface Discoloration", Ser. No. 861,845, filed May 12, 1986.

In the specific area of ion implantation of plastics, most of the interest and research has focused on advantageously changing the electronic and transport properties of a variety of polymers that are normally insulating. By using masks, for instance, conducting paths in an insulating medium are fabricated. See the article authored by M. S. Dresselhaus et al of M.I.T. "Ion Implantation of Polymers," *Mat. Res. Soc. Symp. Proc.*, Vol. 27 (1984), pp. 413-422. Other workers in the field have studied the reaction of iodine ions with solid alkanes and the effect of carbon ions on benzene. See 7th Int. Hot Atom Chem. Symp. (1973) p. 19, and R. M. Lemmon, id., p. 20. Similar work in organometallic compounds, such as metal carbonyls, has indicated that energetic ions, such as copper and chromium, as well as rare-earth ions, interact with such compounds and that about half of the incoming ions become incorporated in the organometallic chain. See G. K. Wolf, "Ion Bombardment Chemistry," *Nucl. Instrum. Methods* 139 (1976) 147.

No one to date, as far as known, has however attempted to ion implant plastics, such as used as transparencies in aircraft, safety glasses and face masks, eyeglasses and contact lenses, or non-transparent plastics, such as used in bearings or safety helmets, so as to enhance their surface hardness or their resistance to chemical attack.

SUMMARY OF THE INVENTION

It is a principal object of the present invention to overcome the above disadvantages by providing an ion implantation process for plastics which materially enhances their surface hardness and their resistance to chemical attack.

More specifically, it is an object of the present invention to provide a process of ion implanting work pieces formed of a plastic material in order to improve their surface characteristics comprising the steps of mounting a plastic workpiece in a chamber, creating a vacuum of about $10^{-5}$ torr within the chamber and, exposing the plastic workpiece to a beam of energetic ions. Preferably, the plastic workpiece is formed of one of a group of plastic materials including the polycarbonates, the acrylics, the combination of polycarbonates and acrylics, and ultra high molecular weight polyethylenes (UHMWPE). Preferably, the energetic ions include aluminum, magnesium, silicon, titanium, yttrium, fluorine and chlorine ions. The ion implanted plastics, in their transparent form, find uses such as in aircraft, spacecraft and automobile transparencies, face and gas masks and the like. In their non-transparent form, the ion implanted plastics are useful as ball bearings, safety helmets, floor coverings, appliance and automobile moldings and the like.

Other objects of the present invention will in part be obvious and will in part appear hereinafter.

The invention accordingly comprises the process and the resultant product of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
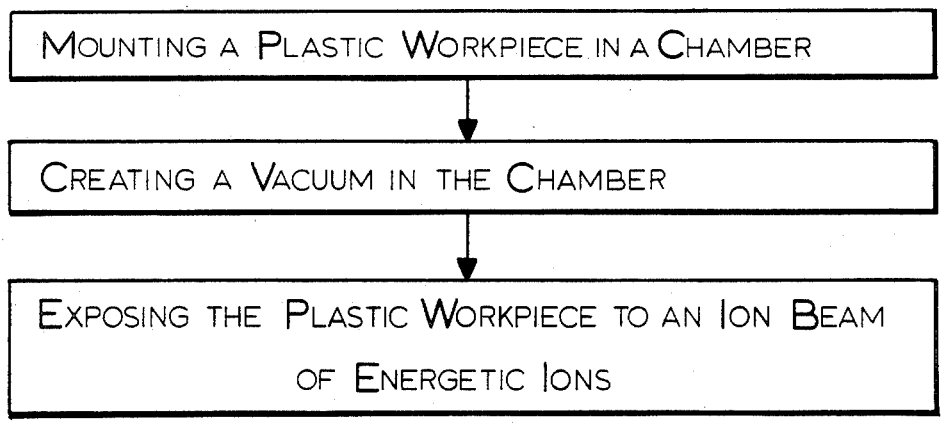
FIG. 1 is a flow diagram illustrating graphically the steps of the process of the invention.

In general, an ion implantation process for plastics according to the invention is illustrated in a flow diagram in FIG. 1. The ion implantation process is designed to materially enhance the surface characteristics of the plastics, in particular by increasing their surface hardness and their resistance to chemical attack. The plastics include workpieces made from transparent and non-transparent plastic materials. Such transparent and non-transparent plastic materials in turn include the polycarbonates, the acrylics and their combinations, and ultra high molecular weight polyethylenes (UHMWPE). The plastic workpieces are ion implanted according to the invention by energetic ions, such as aluminum, magnesium, silicon, titanium, yttrium, fluorine and chlorine ions. The ion implanted plastic workpieces, in their transparent forms, find important uses, among others, as aircraft, spacecraft and automobile transparencies, including windows, windshields, canopies, etc., face and gas masks, lenses for safety and eyeglasses and contact lenses, glazings in plants, schools and buildings exposed to threats of vandalism, lighting covers, and the like. In their non-transparent form, the ion implanted workpieces find important uses, among others, as orthopaedic implants, including knee and hip joints, ball bearings, safety helmets, floor coverings, appliance and automobile moldings, and the like.

Polycarbonates were first developed in 1953 in the laboratories of Farbenfabriken Bayer AG in West Germany In 1960, commercial production of polycarbonate began in the U.S. with the introduction of MERLON, a Mobay Chemical Company trademark, and LEXAN, a General Electric Company trademark. Now polycarbonate is produced worldwide.

Polycarbonates are superior as engineeering plastics; they are rigid, maintain unusual dimensional stability and constant properties through a wide temperature range; they are transparent and resistant to burning. Polycarbonates are relatively soft and most susceptible to solvent attack, however.

Polycarbonates find important uses, among others, as aircraft transparencies and interior components, lenses for safety and eyeglasses and contact lenses, appliance houses, tail and parking light lenses, dome and courtesy light lenses, football, motorcycle and snow mobile helmets, baseball catchers and security personnel's face masks, gas masks, hoods for all-terrain vehicles, windshields, protective industrial head gear used by miners, police and fireman, body armor for use by security personnel, vandalproof glazing in plants, schools and buildings, street and parking lot lenses and refractors, and the like.

The term "acrylic" not only covers the polymers and resins made from acrylic esters, but also includes polymerizable derivatives of both acrylic and methacrylic acide as well as the acid chlorides, nitriles, and amides. From the standpoint of weatherability, hardness, and clarity, the homopolymers and copolymers of methyl methacrylate are considered to be outstanding. Modification of the crystal polymers with various rubbery components and other polymers can add new property dimensions, particularly toughness. These additive materials can be, for example, acrylic rubbers, butadiene systems, and alloys with PVC. The resulting modified acrylics may be called acrylic multipolymers or multiphase systems. In sum, acrylics are somewhat harder than the polycarbonates; acrylics are very brittle, however, and also are subject to crazing under certain conditions.

Acrylic sheet also is used as glazing in industrial plants, schools, and buildings in high vandalism areas where glass replacement costs are high. The building industry uses cast acrylic sheet in the form of safety glazing, facia panels, and other textured and formed building facings.

Cast acrylic sheet was first used in the aircraft industry, and continues to be an important material in canopies, windows, radar plotting boards, and instrument panels.

Composites of acrylic and polycarbonate also are used in aircraft transparencies, including, for example, one piece wrap around canopies in jet fighter aircraft. In such applications, the acrylic serves as thermal insulation for the polycarbonate, which tends to form small moisture bubbles at high temperatures. Acrylic also improves abrasion and solvent resistance of the polycarbonate, and allows easier polishing.

Ultra high molecular weight polyethylenes (UHMWPE), on the other hand, find important uses, among others, in orthopaedics as implants, most notably in artificial knee and hip replacements.

There has been a keen interest in further improving the properties of transparent plastics. For instance, in the case of transparent butadiene modified acrylic multipolymers, the other key properties besides toughness include: good barrier properties, particularly low permeation to air and essential oils; improved resistance to stress and solvent attack at moderate strain levels, and; improved low temperature impact resistance.

The acrylics also find uses in recreational vehicles, boats, and the building industry. The transparent versions, made into sheet, can be thermoformed and utilized directly or made rigid, depending on the application requirements. Applications include lighting fixtures in public areas and skylights for trailers and mobile homes.

Attempts also have been made to further improve the characteristics of these plastics as by coating them, particularly when used as aircraft windshields and windows. However, such coatings have failed, for the most part, due to delamination at the coating-plastic interface caused by thermal and impact stresses.

Figure 2:
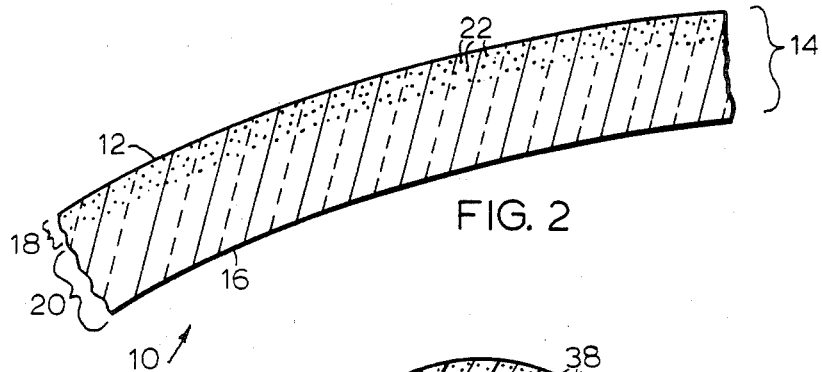
FIG. 2 is a fragmentary section, on an enlarged scale, of a transparency formed of a transparent plastic material and ion implanted according to the process of the invention.
Figure 3:
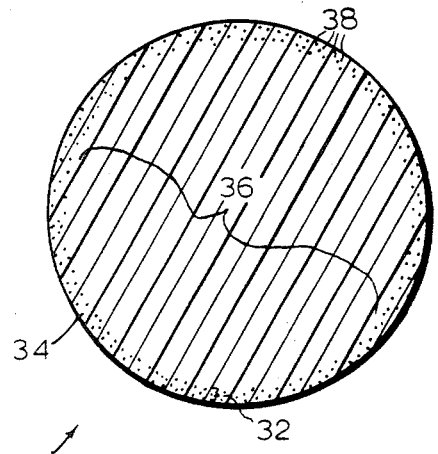
FIG. 3 is a section, also on an enlarged scale, of a plastic product formed of a non-transparent plastic material and ion implanted according to the process of the invention.

The process of the invention has been developed as a further and improved attempt at improving the surface characteristics of such plastics, i.e., the polycarbonates, the acrylics, their respective combinations, and UHMWPE, this time using the ion implantation method and adapting it to the ion implantation of plastics. More specifically, the process of the invention is designed to be employed on individual workpieces formed of such plastic materials. Essentially, the process of the invention is graphically illustrated in FIG. 1. A plastic workpiece, whether transparent as illustrated in FIG. 2 or non transparent as illustrated in FIG. 3, is mounted in a suitable chamber, a vacuum is created within the chamber, and the plastic workpiece is exposed to an ion beam of implantable energetic ions, such as, for example, aluminum, magnesium, silicon, titanium, yttrium, fluorine and chlorine ions, and the like. The ion implantation process of the invention improves the surface characteristics of the plastic workpieces by physically and chemically altering a thin surface stratum of the workpiece without changing the bulk properties thereof.

A representative fragmentary segment of a transparent plastic material 10, ion implanted according to the process of the invention, is illustrated in right cross section in FIG. 2. The segment 10 is that of an aircraft transparency that now possesses an increased surface hardness and an increased surface resistance to chemical attack on its front or outside surface 12 due to its having been exposed to the process of the invention. The transparent plastic segment 10 comprises a layer 14 formed of a transparent plastic material, as above discussed, between its front surface 12 and a back surface 16. The thickness of the layer 14 can vary anywhere from about 0.01 micrometer to about one micrometer, and for the most part, is about 0.5 micrometer. The layer 14 of transparent plastic material is composed of at least two integral stratums: a thin stratum 18 adjacent the front surface 12 and a thick stratum 20 contiguous therewith and extending to the back surface 16. A significant concentration of energetic ions 22, such as aluminum, magnesium, silicon, titanium, yttrium, fluorine or chlorine ions, are illustrated as having been ion implanted into the thin stratum 18. Preferably, this thin stratum 18 has a thickness from about 0.1 to about 0.5 micrometer, depending on the intended application for the resultant product.

The energetic ions 22 preferably are ion implanted into this thin stratum 18 so as to achieve a Gaussian distribution of the ions 22 throughout the thin stratum 18 from its front surface 12 to where it adjoins the thick stratum 20, that is, the bulk of the layer 14. These ion implanted energetic ions 22 contribute to increase its microhardness to at least about 17.00 Kgf/mm$^2$ from about 11.44 Kgf/mm$^2$ at a one gram load and without the ion implantation. The ion implanted energetic ions 22 also work to decrease the surface energy of the plastic layer 14 at its front surface 12 thereof, rendering it more hydrophobic, as well as imparting to it an increased resistance to attack by chemicals. Such chemicals include solvents and acids, such as acetone, alcohol, $H_2SO_4$, methylene chloride and the like. The ion implanted energetic ions 22 within the thin stratum 18 further effect radiation damage within the plastic layer 14 so as to cross link with certain of the polymer chains of the plastic material. The ion implanted energetic ions 22 also react with the polymer chains of the plastic material and form precipitate chemical compounds therewith such as, for example, $Al_2O_3$ and $TiO_2$ where the implanted ions 22 are aluminum and titanium, respectively. For the other implanted ions, the compounds are $MgO$, $Y_2O_3$, $SiO_2$, and fluorinated or chlorinated hydrocarbons. With the mentioned decreased surface energy at the front surface 12, the surface 12 has become more hydrophobic, characterized by an increased surface density.

A representative sample of a non-transparent plastic material 30 in the shape of a plastic ball bearing and ion implanted according to the process of the invention is illustrated in cross section in FIG. 3. If the plastic material 30 is made of UHMWPE and shaped appropriately, it is useful in orthopaedic applications, such as in knee and hip prosthesis. The non-transparent plastic material 30 also comprises a layer composed of two integral stratums: a thin outer stratums 32 adjacent its surface 34 and a thick bulk stratum 36, forming the core thereof. A high concentration of energetic ions 38, such as aluminum, magnesium, silicon, titanium, yttrium, fluorine or chlorine ions, are illustrated as having been ion implanted into the outer thin stratum 32. This thin stratum 32 has a preferred thickness from about 0.1 to about 5 micrometers, depending on the desired degree of hardness for the resultant product. The energetic ions 38 also are ion implanted so as to achieve a Gaussian distribution of the ions 38 throughout the thin stratum 32. As in the case of the layer 10 illustrated in and described with reference to FIG. 2, the ion implanted energetic ions 38 contribute: to increase its microhardness of its surface 34; to decrease its surface energy at its surface 34, rendering it more hydrophobic; to increase its resistance to chemical attack; to effect radiation damage, crosslinking thereby with certain of the polymer chains of the plastic material, and; to react with the polymer chains of the material to form precipitate chemical compounds therewith, in a like fashion as above described.

Figure 4:
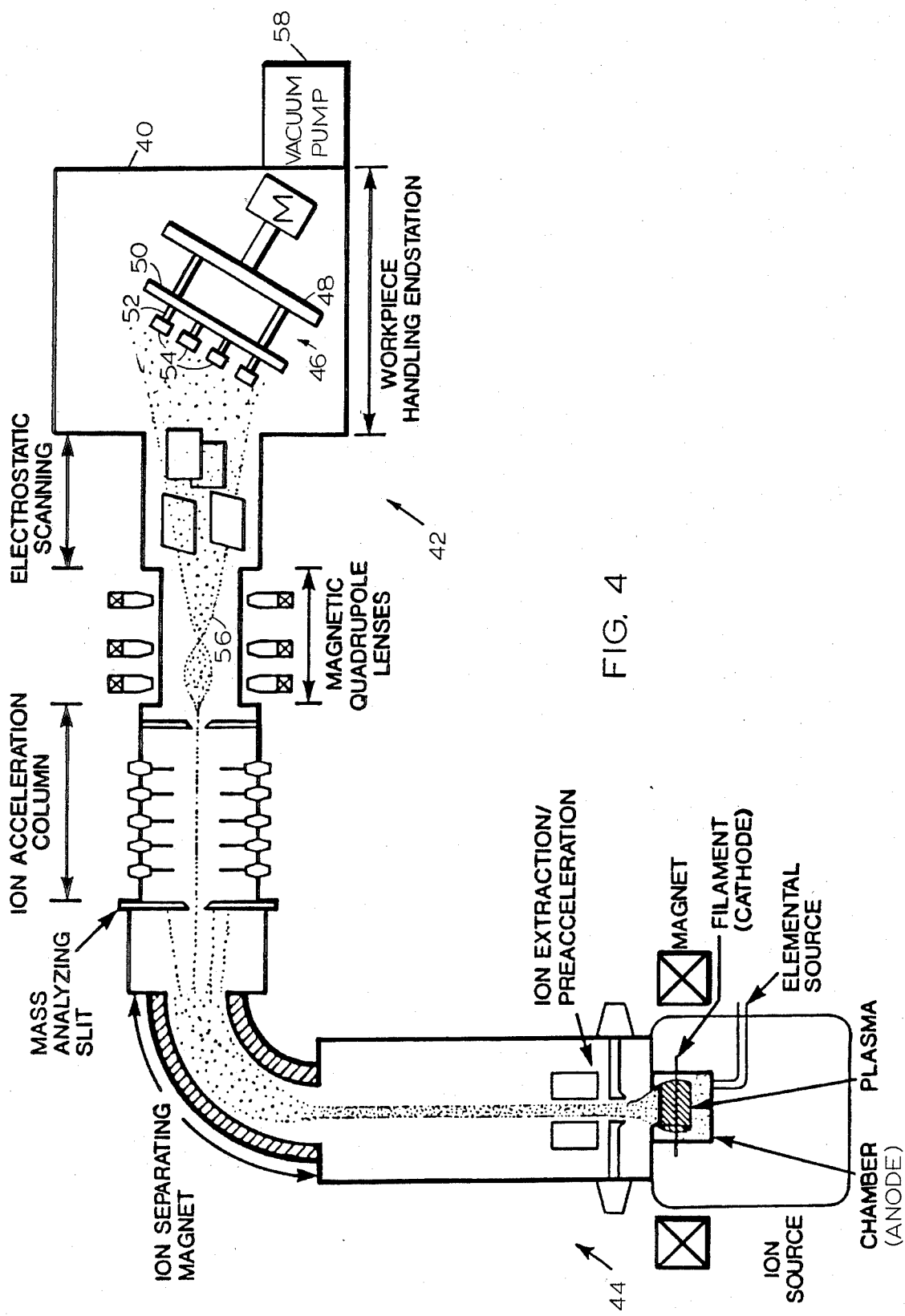
FIG. 4 is a schematic view of an ion beam implanter adapted to practice the steps of the process of the invention.

The process of ion implanting workpieces, including the workpieces 10 and 30 illustrated in FIGS. 2 and 3, is preferably carried out in a suitable implant chamber 40 of a specially designed endstation 42 of a suitable high current ion implanter 44, such as a Varian-Extrion 200 kV implanter, an Eaton-Nova implanter or a like instrument, illustrated in FIG. 4. This ion implanter 44 can be the same as, or an adaptation of the one illustrated in and described in said copending application Ser. No. 861,845, filed May 12, 1986 and assigned to a common assignee.

Within the implantation chamber 40, a suitable fixture 46 is mounted on a base 48 designed for rotation by a suitable motor (M) and for cooling a base plate 50, preferably made of titanium, by means not shown. On the base plate 50 are mounted a plurality of appropriately shaped workpiece holders 52, also preferably made of titanium. These workpiece holders 52 are designed to hold securely a plurality of plastic workpieces 54 and directly to expose these workpieces 54 to an incoming ion beam 56 of oxidizing ions. The illustrated workpieces 54 are like the plastic materials 10 and 30 illustratively described with reference to FIGS. 2 and 3 hereinabove. It is to be understood that the shape of the particular workpiece holders 52 secured to the base plate 50 will of course depend upon the shape of the particular workpieces 54 worked on at that time.

With the plastic workpieces 54 duly mounted within the chamber 40, the next step of the process of the invention involves the creation of a proper vacuum environment within the implantation chamber 40. This is effected by means of a vacuum pump 58 operatively connected to the chamber 40. With the aid of the pump 58, the implantation chamber 40 is preferably evacuated to a vacuum pressure of about $10^{-5}$ torr. Preferably, the vacuum pump 58 should be of an oil-free type so as to avoid the possibility of introducing surface contamination onto the part to be ion implanted.

The plastic workpieces 54 are then exposed to the ion beam 56 of oxidizing ions so as to modify their surface characteristics. Preferably, the ion beam possesses an energy from about 20 to about 500 keV, delivering a dose from about $1 \times 10^{14}$ to about $1 \times 10^{17}$ ions per square centimeter. The above mentioned ion beam energy and ion dose are intended to achieve a current density on the respective surfaces of the workpieces 54 from about 0.1 microampere per square centimeter to about one microampere per square centimeter. The ion implantation process of the invention is effected over a time period from about one half to about four hours, depending on the desired hardness to be achieved by a selected combination of ion dose and ion beam current energy. It has been observed that ion beam current density, as measured by the delivered dose of ions on the surfaces of the workpieces, has a darkening effect on the plastic material, especially in the region of the visible light spectrum between about 4,000 and about 6,000 Angstroms.

We have found that:

1. For a given ion beam energy level, increasing the ion dose will result in an increased hardness of a polycarbonate material, and to a lesser degree in acrylic materials, as observed in both microhardness and abrasion tests;

2. For a given ion beam energy level, increasing the ion dose will result in an increased resistance to solvent attack, as observed from an acetone test.

3. For a given ion beam current, the optical transmission of the implanted plastic material was reduced with increasing ion dose. The reduction of transmission (discoloration) was, however determined to be a function of beam power density (for constant energy, this is the same as current density). As the current density is lowered, the optical transmission is improved. It is believed that the slight discoloration of plastics is due to localized heat generation of the ions as they slow down and stop in the plastic and can be eliminated by using a less intense ion beam (lower current density).

In sum: the hardness of polycarbonates/acrylics can be increased with increasing ion dose. By spreading the ion beam 56 over a larger area and consequently lowering the current density at the plastic material's surface, the slight darkening of the plastics can be effectively controlled.

Thus it has been shown and described a process for the ion implantation of plastic materials with oxidizing ions designed to improve their surface characteristics, notably their surface hardness and their resistance to chemical attack, which process and resultant product satisfy the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. An inflexible plastic material with improved surface characteristics, including increased surface hardness and increased surface resistance to chemical attack, comprising:
   (a) a layer formed of said inflexible plastic material of one of a group of plastic materials comprising the polycarbonates, the acrylics, a combination of polycarbonates and acrylics, and ultra high molecular weight polyethylenes;
   (b) said layer composed of at least two integral stratums: a thin stratum and a thick stratum contiguous therewith, wherein said thin stratum has a thickness from about 0.1 to about 5 micrometers;
   (c) said thin stratum being ion implanted with an ion beam of energetic ions, wherein said implanted ions within said thin stratum impart to said layer said increased surface hardness and said increased surface chemical resistance; said implanted ions comprising aluminum, magnesium, silicon, titanium, yttrium, fluorine and chlorine ions.

2. The plastic material of claim 1 which is transparent.

3. The plastic material of claim 1 wherein the surface of said thin stratum is hydrophobic, and wherein said thin stratum has increased density of material, and wherein said hydrophobic surface possesses decreased surface energy.

4. The plastic material of claim 1 wherein said implanted ions within said thin stratum cause radiation damage so as to crosslink with certain of the polymer chains of said plastic material.

5. The plastic material of claim 1 wherein said implanted ions react with the polymer chains of said inflexible plastic material and form precipitate chemical compounds, said precipitate chemical compounds including: $Al_2O_3$, $TiO_2$, $Y_2O_3$, MgO, $SiO_2$, and fluorinated and chlorinated hydrocarbons.

* * * * *

UNITED STATES PATENT AND TRADEMARK OFFICE
CERTIFICATE OF CORRECTION

PATENT NO. : 4,743,493

DATED : May 10, 1988

INVENTOR(S) : Piran Sioshansi and Richard W. Oliver

It is certified that error appears in the above-identified patent and that said Letters Patent is hereby corrected as shown below:

In claim 1, paragraph (c), column 8, line 6 of the patent, please insert, before "aluminum"
--at least a member of the class consisting of--

Signed and Sealed this

Twenty-fourth Day of January, 1989

Attest:

DONALD J. QUIGG

*Attesting Officer*      *Commissioner of Patents and Trademarks*